UNITED STATES PATENT OFFICE.

OSSIAN ASCHAN, OF HELSINGFORS, RUSSIA, AND WILHELM KEMPE, OF BERLIN, GERMANY, ASSIGNORS TO CHEMISCHE FABRIK AUF ACTIEN (VORM. E. SCHERING), OF BERLIN, GERMANY.

PROCESS OF PREPARING CAMPHOR.

994,437.   Specification of Letters Patent.   Patented June 6, 1911.

No Drawing.   Application filed January 11, 1909.   Serial No. 471,799.

*To all whom it may concern:*

Be it known that we, OSSIAN ASCHAN, chemist, citizen of Finland, Empire of Russia, residing at Helsingfors, Russia, and WILHELM KEMPE, chemist, citizen of the German Empire, residing at Berlin, Germany, have invented a new and useful Improvement in Processes of Preparing Camphor, of which the following is a specification.

According to this invention camphor is obtained by heating a borneol, which may be borneol or isoborneol in the liquid state, with or without a solvent, in the presence of a metal having the property of splitting off hydrogen from borneol, such as nickel, cobalt, copper, &c., nickel and cobalt being particularly desirable and effective.

The action of the metal is catalytic. In heating the borneol with the metal the latter takes up hydrogen from the borneol, thereby producing camphor and a combination of the metal and hydrogen, which combination decomposes readily into its constituents. The hydrogen escapes and the metal acts further upon unchanged borneol in the same manner. The following equations, in which Me indicates a catalytic metal, illustrate the reaction:

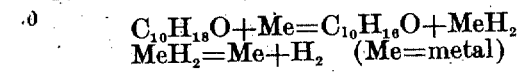
$$C_{10}H_{18}O + Me = C_{10}H_{16}O + MeH_2$$
$$MeH_2 = Me + H_2 \quad (Me = metal)$$

The effect of the metal consists in taking up hydrogen from the borneol and then releasing the hydrogen. The resulting camphor is recovered by distillation, while the metal remains as a residue and can be used again.

If an oxid is used, for instance, cupric acid, it should be used in quantity which is insufficient to oxidize the borneol. The oxid is reduced to metal and the latter acts as described.

Any solvent may be used which dissolves the borneols at the temperature at which the process is carried on and which does not chemically influence the borneols or the metal.

Preferably the metal is added gradually as the reaction is more complete than when a larger quantity of metal is added at the same time.

*Examples.*

1. 10 parts of isoborneol and 30 parts of paraffin are heated to 230° or 240° C. in an open vessel with the addition of 2 parts of powdered nickel until the evolution of hydrogen ceases. The separation and purification of the camphor is effected in the usual manner. The yield in pure camphor exceeds 80 per cent.

2. 5 parts of isoborneol and one part of xylol are heated with one part of powdered nickel for two and a half hours to 198° or 200° C. Then the temperature is raised to 400° C. and more powdered nickel, about 0.2-0.4 parts, is added until there is no further reaction. The yield of pure camphor is about 85 per cent., while without the second addition of metal the yield would be only about 20 per cent.

3. 5 parts of isoborneol and two parts of petroleum are heated and stirred in a closed vessel with one part of nickel for one hour at 230° C.

4. 10 parts of borneol, 30 parts of paraffin and one part of petroleum are heated with the addition of one part of nickel in an open vessel at 240° C. When the evolution of hydrogen slackens 4 portions of about ¼ of a part of nickel are added one after another, a fresh portion not being added until the evolution of hydrogen has ceased. The yield of pure camphor is about 94.5 per cent.

5. 10 parts of borneol and 0.4 parts of xylol are heated in such manner as to allow the sublimated portions of the borneol to return. The xylol does not operate here as a solvent, as it does in example 2. Nickel in the proportion of 0.8 parts is then added and the mixture heated to 200° C. until the liberation of hydrogen ceases or slackens. Further additions of metal are made as necessary. The yield of pure camphor is about 80 per cent.

6. To 100 kilograms of isoborneol which have been dissolved in 100 kilograms of paraffin oil, are added 2 kilograms of finely divided cobalt, the mixture being then heated. The reaction takes place below 200° C. and is complete in two hours. The yield of pure camphor is about 98 per cent.

7. 100 kilograms of commercial isoborneol and 4 kilograms of finely divided cobalt are heated together. The evolution of hydrogen takes place below 190° C. and is complete in five hours, the temperature being allowed to rise at the finish to 202° C.

The catalytic metals contemplated by this application are metals which have the property of splitting off hydrogen from a borneol, whether borneol or isoborneol.

We claim as our invention:

1. The herein described process of producing camphor from a borneol which consists in heating the borneol in the liquid state in the presence of a catalytic metal which is immersed in the liquid.

2. The herein described process of producing camphor from a borneol which consists in heating the borneol in the liquid state in the presence of a solvent and a catalytic metal which is immersed in the liquid.

3. The herein described process of producing camphor from a borneol which consists in heating the borneol in the liquid state in the presence of a catalytic metal, which metal is added gradually to the liquid borneol.

4. The herein described process of producing camphor from a borneol which consists in heating the borneol in the liquid state in the presence of a solvent and a catalytic metal which is added gradually to the liquid borneol.

In testimony whereof we hereunto set our signatures in the presence of witnesses.

OSSIAN ASCHAN.
WILHELM KEMPE.

Witnesses as to Ossian Aschan:
J. KUMMARN,
W. LINDROTEN.

Witnesses as to Wilhelm Kempe:
HENRY HASPER,
WOLDEMAR HAUPT.

It is hereby certified that in Letters Patent No. 994,437, granted June 6, 1911, upon the application of Ossian Aschan, of Helsingfors, Russia, and Wilhelm Kempe, of Berlin, Germany, for an improvement in "Processes of Preparing Camphor," an error appears in the printed specification requiring correction as follows: Page 1, line 40, the word "acid" should read *orid;* and that the said Letters Patent should be read with this correction therein that the same may conform to the record of the case in the Patent Office.

Signed and sealed this 27th day of June, A. D., 1911.

[SEAL.]

C. C. BILLINGS,
*Acting Commissioner of Patents.*